April 30, 1968 R. E. LANG 3,380,279
METALWORKING APPARATUS
Filed March 24, 1966 3 Sheets-Sheet 3
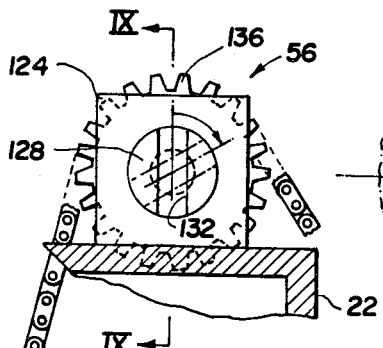
Fig. 8.
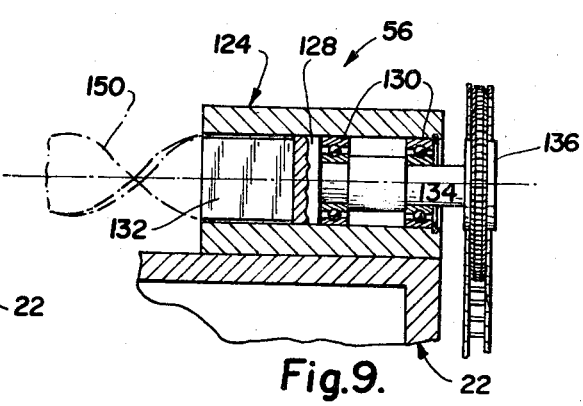
Fig. 9.
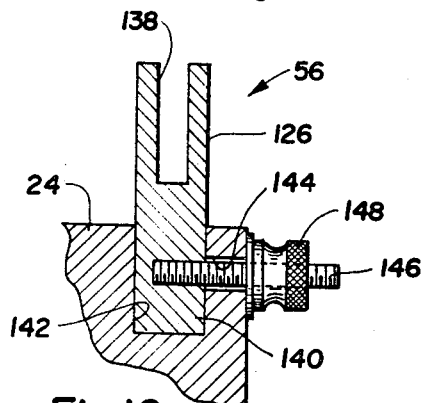
Fig. 10.
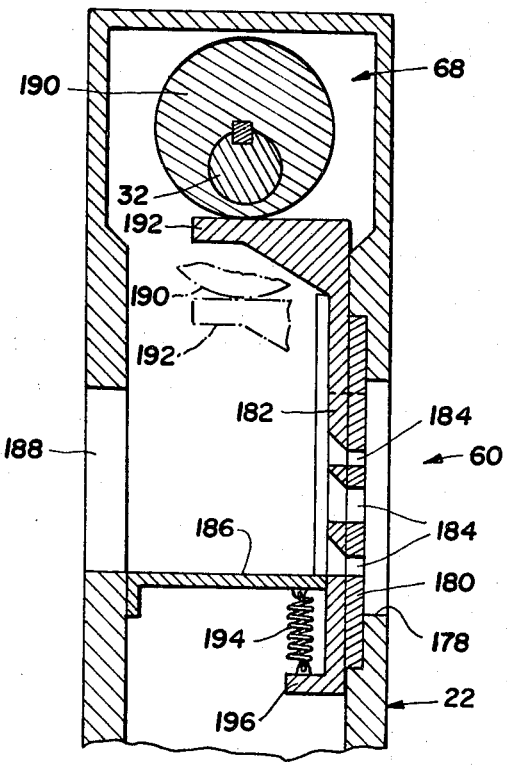
Fig. 11.
Fig. 12.
INVENTOR.
RICHARD E. LANG
BY
ATTORNEY United States Patent Office 3,380,279
Patented Apr. 30, 1968

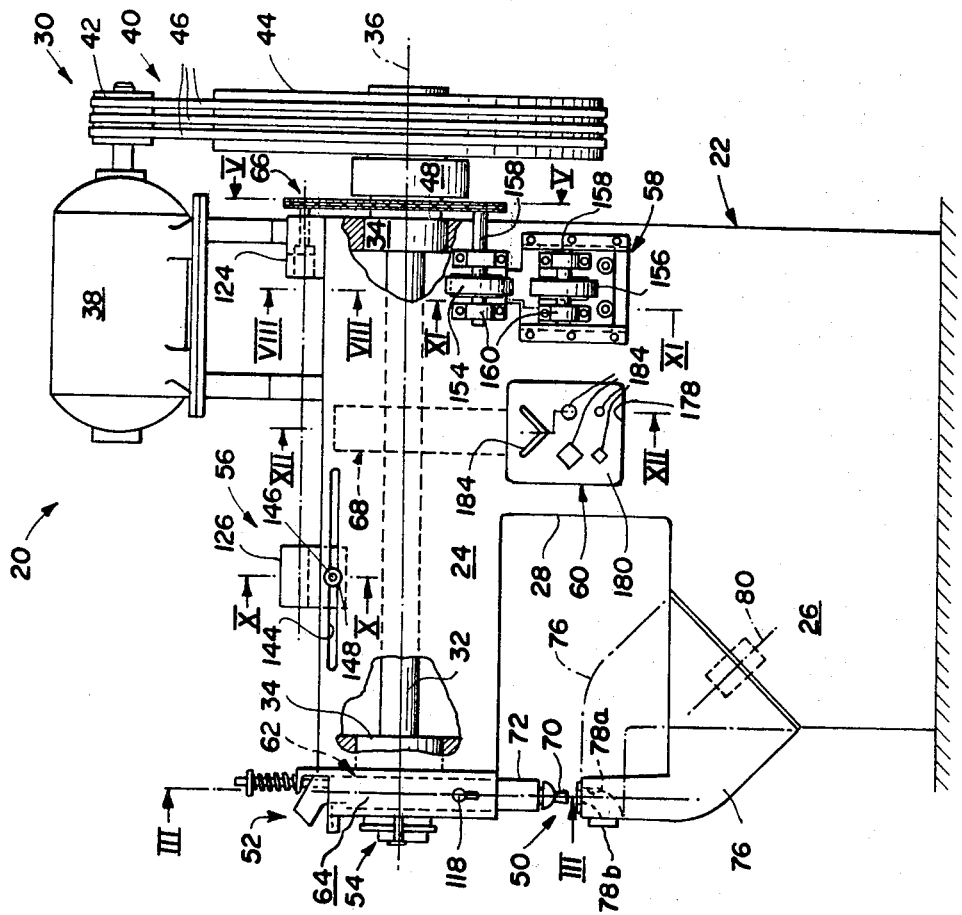

3,380,279
METALWORKING APPARATUS
Richard E. Lang, 100 Grienbriar Drive,
Carnegie, Pa. 15106
Filed Mar. 24, 1966, Ser. No. 537,046
8 Claims. (Cl. 72—294)

This invention relates to metalworking apparatus, and more particularly to apparatus adapted to perform a plurality of work-operations on metal workpieces of various sizes and shapes.

As is known, many work-operations are required to produce, for example, a finished wrought iron product. These work-operations include, piercing, notching, curling, shearing, twisting and embossing. Heretofore, these operations were performed on separate pieces of equipment each of which may or may not be equipped with a drive motor. Consequently, a large work space was required in which these various pieces of equipment could be set up. In some instances, complex drive mechanisms were provided including, for example, a plurality of pulleys, belts and clutch mechanisms, arranged such that a number of the pieces of equipment could be driven by a single drive motor. It should be readily apparent that the individual pieces of equipment and the various drive motor along with the complex drive mechanisms are necessarily expensive. Taken in conjunction with the large work space required to set up these pieces of equipment, the overall metalworking operation has, heretofore, been a relatively costly operation.

Accordingly, as an overall object, the present invention seeks to provide a single piece of equipment capable of performing a plurality of work-operations.

Another object of the invention is to provide metalworking apparatus employing a single drive motor for powering a plurality of work performing mechanisms.

Still another object of the invention is to provide a single and improved piece of equipment which is capable of performing work-operations including piercing, notching or coping, curling, shearing, twisting and embossing.

In accordance with the present invention, a metalworking apparatus is provided comprising a main frame or housing having upper and lower arms. The apparatus includes a single power source comprising a drive shaft extending centrally through the upper arm of a single drive motor. The drive motor is connected to the drive shaft by means of a belt and pulley arrangement which includes a flywheel, and clutch means of the type which operates to rotate the drive shaft through a single revolution when the apparatus is energized.

As will become apparent from the following detailed description, the single drive shaft is employed to reciprocate a ram member, carried at the forward end of the upper arm, toward and away from a die block disposed therebelow and supported at the forward end of the lower arm. Associated with the ram member is a punch bit positioned to enter a die opening provided in the subjacent die block for piercing workpieces, and one of a pair of cooperating cutter members employed in performing a coping operation. A bar curling mechanism is carried at the forward end of the drive shaft and is employed to curl flat strips of metal to produce the well-known scroll configuration.

The main frame also carries a mechanism, commonly known as a "picket twister," which is used to twist an elongated flat strip of metal about its longitudinal axis to provide a plurality of twists therein. A pair of embossing rolls are also carried by the main frame and are adjustable to correspond to the thickness of the workpiece being embossed. A single connecting means is employed to connect the picket twister mechanism and the embossing rolls to the single drive shaft, the arrangement being such that one element of the picket twister and one of the embossing rolls are rotated through a plurality of revolutions for each revolution of the drive shaft. Shearing means is provided which is operatively connected with the single drive shaft for operating the same. The shearing means is adapted to shear various workpieces.

The above and other objects and advantages of the present invention will become apparent from the following detailed description by reference to the accompanying drawings, in which:

FIGURE 1 is a side view of the metalworking apparatus of the invention;

FIG. 2 is a front view of the metalworking apparatus of the invention;

FIG. 8 is a cross-sectional view, taken along the line VIII—VIII of FIG. 1, illustrating one of the two holders employed in twisting means of the invention;

FIG. 9 is a cross-sectional view taken along the line IX—IX of FIG. 8;

FIG. 10 is a cross-sectional view, taken along the line X—X of FIG. 1, illustrating a second of two holders employed in twisting means of the invention;

FIG. 11 is a cross-sectional view, taken along the line XI—XI of FIG. 1, illustrating embossing means; and FIG. 12 is a cross-sectional view, taken along the line XII—XII of FIG. 1, illustrating shearing means.

*General description*

Figure 3:
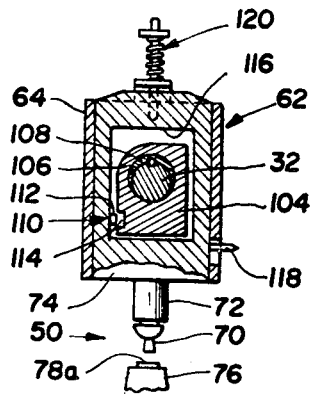
FIG. 3 is a cross-sectional view, taken substantially along the line III—III of FIG. 1, illustrating a first intermediate drive means.

Reference now is directed to FIGS. 1 and 2 wherein there is illustrated a metalworking apparatus 20 constructed in accordance with the principles of the present invention. The apparatus 20 includes a main frame 22 having upper and connecting corresponding ends of the upper and lower horizontal arms 24, 26.

The apparatus 20 includes a single power source indicated generally by the numeral 30. The single power source 30 includes a single drive shaft 32 extending centrally through the upper arm 24 and supported therein by journals 34 for rotation about its longitudinal axis indicated by the dash-dot line 36. The single power source 30 also includes a single drive motor 38 supported on the upper arm 24 and a belt and sheave arrangement, generally indicated at 40, which includes a drive sheave 42 mounted on the motor 38, a flywheel 44 and a plurality of drive belts 46.

Clutch means 48 is mounted on the single drive shaft 32 and serves, when energized, to connect the flywheel 44 to the single drive shaft 32. The clutch means 48 is a conventional well-known clutch of the type which causes the drive shaft 32 to be rotated only through a single revolution. That is to say, when the clutch means 48 is activated, the drive shaft 32 is connected to the flywheel 44 and rotated thereby. When the drive shaft 32 has rotated through a predetermined number of angular degrees (less than 360°), the clutch means 48 is released causing the drive shaft 32 to come to a dead stop after having rotated through one revolution (360 angular degrees). The construction and operation of the clutch means 48 is very well known in the art and, therefore, a complete description thereof is not believed to be necessary.

The single power source 30 is employed to drive a plurality of work performing mechanisms including piercing means 50, notching means 52 and curling means 54, all disposed at the forward end of the main frame 22, and twisting means 56, embossing means 58 and shearing means 60 all carried at the rear portion of the main frame 22. First intermediate drive means 62, disposed within a housing 64 carried at the forward end of the upper arm 24, powers the piercing means 50 and the notching means 52. The curling means 54 is driven directly from the single drive shaft 32. Second intermediate drive means 66 disposed at the rear of the main frame 22 is employed to power the twisting means 56 and the embossing means 58. Third intermediate drive means 68 disposed within the upper arm 24, is employed to power the shearing means 60.

*Piercing means 50*

Referring now to FIGS. 1, 2 and 3, the piercing means 50 includes a punch bit 70 carried in a bit holder 72 which, in turn, is secured to a ram member 74. A housing 64 supports the ram member 74 for vertical reciprocation. A die block 76 is carried at the forward end of the lower arm 26 and has at least one and preferably two die openings 78a, 78b. The die block 76 preferably comprises that reversible die block disclosed and claimed in my U.S. Patent No. 3,222,973, issued Dec. 14, 1965. For the purpose of the present invention, it will be sufficient to state that the die block 76 is supported, as best shown in FIG. 1, for rotation about an inclined axis 80 whereby in one position the die opening 78a is aligned with the punch bit 70 and in another position, as illustrated in dash-dot outline in FIG. 1, the die opening 78b is aligned with the punch bit 70. The two alternative positions of the die block 76 permits various shaped workpieces to be positioned beneath the punch bit 70 for piercing. For a complete and concise description of the preferred construction and operation of the die block 76, reference is directed to the aforesaid U.S. Patent No. 3,222,973.

As will be explained, the ram member 74 is forced downwardly thereby displacing the punch bit 70 through a workpiece into one of the die openings 78a, 78b and thereafter is forced upwardly to extricate the punch bit 70 from the workpiece. Furthermore, the ram member 74 is of the free-floating type, that is, it may be lowered adjacent a workpiece to be pierced so that the opening may be pierced at the desired location on the workpiece.

*Notching means 52*

Figure 4:
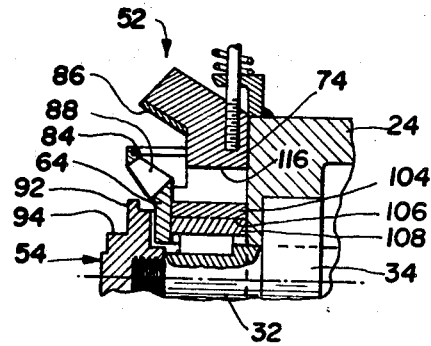
FIG. 4 is a cross-sectional view, taken along the line IV—IV of FIG. 2, illustrating notching means.

Reference is now directed in particular to FIG. 4, wherein the notching means 52 is shown comprising co-operating cutter members 84, 86. The cutter member 84 is affixed to the housing 64. The cutter member 86 is carried by the ram member 74 and is reciprocable therewith toward and away from the cutter member 84. An opening 88 is disposed below the cutter member 84. After a notch has been cut in a workpiece, the segment cut from the workpiece will be discharged through the opening 88.

*Curling means 54*

Figure 6:
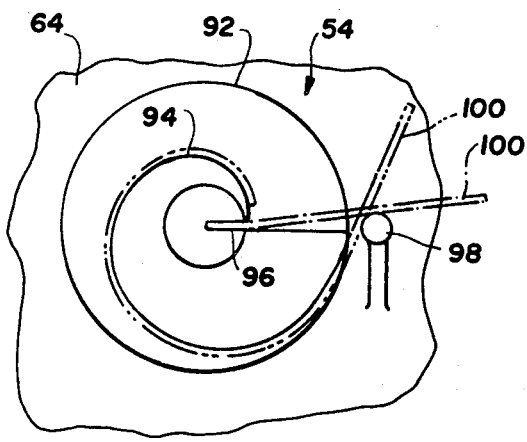
FIG. 6 is a fragmentary front view, on an enlarged scale, illustrating curling means.
Figure 7:
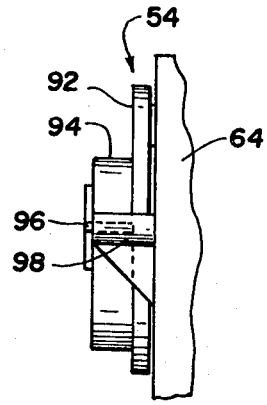
FIG. 7 is a side view of the apparatus of FIG. 6.

As can be seen in FIGS. 4, 6 and 7, the curling means 54 comprises a disc member 92 threaded or otherwise secured to the forward end of the drive shaft 32 for rotation therewith. Projecting perpendicularly from the front face of the disc member 92 is a working surface 94 which is shaped in the form of a spiral extending from a slot 96 in a counterclockwise direction, and terminating at a location along the periphery of the disc member 92. Co-operating with the disc member 92 is a workpiece support member 98 which projects outwardly of the housing 64 and is positioned to support a workpiece during the curling operation.

As illustrated in FIG. 6, one end of the workpiece, indicated by the dash-dot outline 100, is inserted into the slot 96. When the disc member 92 is rotated through one revolution, the workpiece 100 will be deformed into a spiral configuration as illustrated by the dot-dot-dash outline. Thereafter, the opposite end of the workpiece 100 may be inserted into the slot 96 and the disc member 92 rotated through one revolution. The resulting product will be a flat strip having a generally S-shaped configuration as normally seen in wrought iron products.

*First intermediate drive means 62*

The first intermediate drive means 62 preferably comprises that drive means described and claimed in my co-pending application Ser. No. 527,586, filed Feb. 15, 1966, and entitled "Free Floating Ram Members for Punch Presses and The Like." For the purpose of the present invention, however, reference is now directed to FIGS. 3 and 4. The first intermediate drive means 62 comprises a pitman member 104 having a circular opening 106. An eccentric cam member 108 is secured to the single drive shaft 32 and resides within the circular opening 106. The overall arrangement is such that when the single drive shaft 32 is rotated through one revolution, the eccentric cam member 108 will rotate in the circular opening 106, causing the pitman member 104 to be moved in a circular path. That is to say, during the first half of a single revolution, the pitman member 104 will be moved to the right of FIG. 3, then downwardly into engagement with the ram member 74 at which time the ram member 74 is forcibly displaced downwardly so that the punch bit 70 moves into the die opening 78a, for example. During the second half of the single revolution, the pitman member 104 will be moved to the right of FIG. 3 and upwardly into the top dead center position illustrated in FIG. 3. During the second half of the single revolution, cooperating catch means 110 are engaged and operate to elevate the ram member 74 whereby the punch bit 70 will be extricated from the opening pierced in a workpiece. The cooperating catch means 110 may, for example, comprise a pin member 112 projecting from the ram member 74 toward the pitman member 104, and a notch 114 in the pitman member 104 which is positioned to receive the pin member 112 during the second half of a single revolution of the drive shaft 32.

The ram member 74 has a generally rectangular opening 116 which corresponds to the generally rectangular configuration of the pitman member 104. The pitman member 104 is smaller than the generally rectangular opening 116 and when in the top dead center position shown in FIG. 3, has its lateral sides spaced from the sides of the ram member 74. Furthermore, the length of the pin member 112 is less than the spacing between the pitman member 104 and the ram member 74. Consequently, when the pitman member is in its top dead center position, as shown in FIG. 3, the ram member 74 is freely movable in a vertical direction, that is, in the direction of its reciprocation. Therefore, the ram member 74 may be lowered so as to place the punch bit 70 adjacent the workpiece to insure that the opening to be pierced will be pierced at a precise location on the workpiece. A handle 118 is connected to the ram member 74 and facilitates positioning of the punch bit 70. Adjustable spring means 120 positioned at the top of the frame 64 serves to counterbalance the weight of the ram member 74.

*Twisting means 56*

Referring now to FIG. 1, the twisting means 56 comprises, in general, a first holder 124 rigidly secured adjacent the rear of the main frame 22 and a second holder 126 which is releasably and slideably supported on the arm 24 for movement toward and away from the first holder 124.

Referring now to FIGS. 8 and 9, the first holder 124 has a rotary member 128 journaled therein, by means of bearings 130, for rotation about an axis which extends toward the second holder 126 (see FIG. 1). The forward end of the rotary member 128 is provided with a slot 132 adapted to receive the end of a workpiece. The rotary member 128 has a stub shaft 134 projecting rearwardly thereof beyond the first holder 124. A sprocket 136 is secured to the stub shaft 134 and serves to rotate the rotary member 128 when the clutch means 48 is activated.

Referring now to FIGS. 1 and 10, the second holder 126 is provided with a slot 138 adapted to receive the opposite end of a workpiece. The second holder 126 has a base portion 140 residing in and slideable along a groove 142 cut in the upper arm 24. The upper arm 24 has an elongated slot 144 extending, for example, parallel with the drive shaft 32. A threaded stud 146 is secured to the second holder 126 and projects through the elongated slot 144 to receive a locking nut 148. The overall arrangement is such that when the locking nut 148 is loosened, the second holder 126 may be moved along the groove 142 either toward or away from the first holder 124 so as to adjust the spacing between the holders 124, 126 to correspond to the length of a workpiece being twisted.

In operation, the opposite ends of a workpiece are inserted into the slot 132 of the rotary member 128 and the slot 138 at the second holder 126. When the rotary member 128 is rotated, the workpiece will be twisted about its longitudinal axis in the manner illustrated in FIG. 9 by the dash-dot outline of a workpiece 150.

*Embossing means 58*

As can be seen in FIGS. 1 and 11, the embossing means 58 comprises spaced embossing rolls 154, 156 each having a shaft 158 supported in spaced journals 160 for rotation about their longitudinal axes. The embossing rolls 154, 156 are supported on the side of the main frame 22 and are spaced apart so that a workpiece may be introduced therebetween for embossing opposite faces thereof. Openings 162a and 162b are provided in the opposite side walls of the main frame 22. A platform 164 extends between the openings 162a, 162b and serves to support the workpiece as it travels through the main frame 22 and out of the opening 162b.

The journals 160 of the embossing roll 154 are rigidly affixed to the main frame 22. The shaft 158 of the embossing roll 154 extends rearwardly of the frame 22 and has a sprocket 166 secured thereto for driving the embossing roll 154.

The journals 160 of the embossing roll 156, however, are carried on a plate 168 which is slideably supported on the main frame 22 for movement toward and away from the embossing roll 154. Locking fasteners 170 secure the plate 168, and hence, the embossing roll 156, in a preselected position relative to the embossing roll 154. The overall arrangement is such that the embossing roll 156 may be moved to adjust the spacing between the embossing rolls 154, 156 to correspond to the thickness of a workpiece which is to be embossed. In accordance with the present invention, the embossing means 58 employs two embossing rolls whereby the opposite faces of a workpiece are embossed simultaneously. This arrangement is preferred inasmuch as deformation stresses created by embossing one face of a workpiece will be counterbalanced by deformation stresses created by embossing the opposite face of the workpiece. Hence, the workpiece, when embossed, will retain its original straight-line configuration. This should be compared with prior art embossing devices wherein only one face of a workpiece was embossed at one time and wherein the resulting workpiece had a wavy configuration.

*Second intermediate drive means 66*

Figure 5:
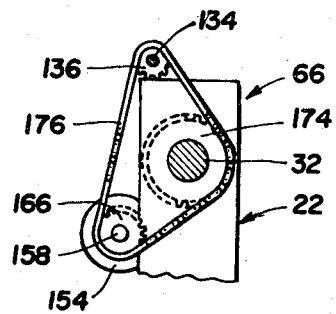
FIG. 5 is a cross-sectional view, taken along the line V—V of FIG. 1, illustrating a second intermediate drive means.

Referring now to FIG. 5, the second intermediate drive means 66 includes the sprocket 136 associated with the rotary member 128, the sprocket 166 associated with the embossing roll 154, a large sprocket 174 secured to the single drive shaft 32 and a drive chain 176 extending around and engaged with the sprockets 136, 166 and 174.

Accordingly, whenever the main drive shaft 32 is rotated, the drive chain 176 causes simultaneous rotation of the sprockets 136, 166 and, hence, the rotation of the rotary member 128 and of the embossing roll 154.

The pitch diameter of the sprocket 136 is such that for each revolution of the sprocket 174, the sprocket 136 will undergo, for example, six revolutions so that six twists will be provided in an elongated workpiece supported between the first and second holders 124, 126 of the twisting means 56. Also, the pitch diameter of the sprocket 166 is such that for each revolution of the sprocket 174, the sprocket 166 and hence the embossing roll 154 will be rotated through two or more revolutions, the overall arrangement being such that a workpiece will be embossed throughout its entire length.

*Shearing means 60*

Referring now to FIGS. 1 and 12, the main frame 22 has a generally rectangular opening 178 through which is exposed a stationary shear plate 180 secured to the main frame 22. A second shear plate 182 is supported in engagement with the stationary shear plate 180 and for vertical reciprocation. The stationary shear plate 180 and the second shear plate 182 are provided with a plurality of openings 184 each of which corresponds to the shape of a different workpiece. For example, as illustrated in FIG. 1, one of the openings corresponds to the transverse shape of an angle while the other openings correspond to different diameter round bars and different size square bars. It should be evident that, if desired, additional openings, of different shapes, may be provided in the shear plates 180, 182.

A platform 186 extends between the second shear plate 182 and a second opening 188 provided in the opposite wall of the main frame 22. Accordingly, a workpiece which has been introduced through one of the openings and sheared by the shearing means 60 will fall on the platform 186 and be retrievable through the opening 188.

*Third intermediate drive means 68*

Referring still to FIG. 12, the third intermediate drive means 68 connects the second shear plate 182 through the single drive shaft 32 whereby during one revolution of the single drive shaft 32, the second shear plate 182 will be reciprocated sequentially downwardly and then upwardly. The third intermediate drive means 68 may comprise, for example, an eccentric cam member 190 keyed or otherwise secured to the single drive shaft 32. The cam member 190 is engaged with an upper flange 192 extending laterally from the second shear plate 182. It should be evident that as the single drive shaft 32 rotates, for example, in a clockwise direction, the cam member 190 will force the shear plate 182 in a downward direction into a maximum downwardly displaced position illustrated in dash-dot outline. Thereafter, the cam member 190 will rotate to the position shown in FIG. 12. Return means, such as, spring members 194 (only one shown) having their ends connected to the platform 186 and a lower flange 196, is provided to return the second shear plate 182 to its normally elevated position shown in FIG. 12.

Although the invention has been shown in connection with one specific embodiment, it will be readily apparent to those skilled in the art that various changes in form and arrangement of parts may be made to suit requirements without departing from the spirit and scope of the invention.

I claim as my invention:

1. Apparatus for performing multiple work-operations on workpieces of various shapes and sizes, comprising a main frame having horizontal upper and lower arms and a vertical portion connecting corresponding ends of said upper and lower arms; a drive shaft extending through said upper arm and supported therein for rotation about its longitudinal axis; a die block carried at the forward end of said lower arm and having at least one die opening therein; a ram member; housing means at the forward end of said upper arm for supporting said ram member for vertical reciprocation toward and away from said die block; means including an eccentric cam for connecting said ram member to said drive shaft whereby said ram member is reciprocated once for each revolution of said drive shaft; a punch bit carried by said ram member and positioned to enter said die opening; cooperating cutter members, one carried by said housing means and the other secured to said ram member and reciprocable therewith, said cooperating cutters being adapted to notch a workpiece; means including a disc member carried at the end of said drive shaft for deforming an elongated workpiece into a spiral configuration; a support member projecting from said housing means adjacent said deforming means and positioned to support a workpiece during deformation; and drive means operatively connected to said drive shaft including clutch means for rotating said drive shaft through a single revolution, whereby said disc member is rotated through a single revolution and whereby said ram member is reciprocated toward and away from said die block and simultaneously causes (a) a punch bit to enter and be retracted from said die opening, and (b) said other cutter member to reciprocate past said one cutter member.

2. The apparatus as defined in claim 1 wherein said ram member has a generally rectangular opening and wherein said ram member reciprocating means comprises: a pitman member residing within said generally rectangular opening, said eccentric cam being secured to said drive shaft and being slideably engaged in a circular opening in said pitman member whereby when said drive shaft is rotated said cam member causes said pitman member to be moved in a circular path and into engagement with said ram member to forcibly move the same toward said die block; and including cooperating catch means on said pitman member and said ram member for connecting said pitman member to said ram member to retract said punch bit from said die opening, said cooperating catch means being positioned for engagement only during movement of said pitman member away from said die block.

3. The apparatus as defined in claim 2 wherein the vertical dimension of said pitman member is less than the corresponding vertical dimension of said rectangular opening, whereby said ram member is freely movable in the direction of reciprocation so that said punch bit may be lowered into engagement with a workpiece supported on said die block.

4. The apparatus as defined in claim 1 including means for twisting an elongated workpiece about its longitudinal axis comprising first and second holders supported on said main frame in spaced-apart relation, a rotary member supported by said second holder for rotation about an axis extending through said first holder; said first holder and said rotary member having slots therein positioned to receive the oposite ends of said elongated workpiece; and means including a drive sprocket secured to said rotary member for connecting said rotary member in torque-transmitting relation with said drive shaft; said drive sprocket being of a size to cause multiple revolutions of said rotary member for each revolution of said drive shaft.

5. The apparatus as defined in claim 1 including means for embossing the opposite faces of a workpiece comprising: spaced embossing rolls journaled to said main frame for rotation about parallel central axes, means releasably securing one of said embossing rolls to said main frame whereby the spacing between said embossing rolls may be adjusted to correspond to the thickness of said workpiece; and means including a drive sprocket secured to said other of said embossing rolls for connecting the other of said embossing rolls in torque-transmitting relation with said drive shaft; said drive sprocket being of a size to cause rotation of said embossing rolls during a number of revolutions sufficient to emboss said workpiece along its entire length.

6. The apparatus as defined in claim 1 including means for shearing a number of workpieces of a variety of sizes and shapes, comprising a stationary shear plate secured to said main frame and a second shear plate engaged with said stationary shear plate; means supporting said second shear plate for movement relative to said stationary shear plate; said shear plates having a number of registrable openings whose shapes correspond to the shapes of a variety of workpieces; and means operatively connecting said second shear plate to said drive shaft for reciprocating said second shear plate relative to said stationary shear plate.

7. The apparatus as defined in claim 1 including means for twisting an elongated workpiece through multiple revolutions about its longitudinal axis and means for embossing the opposite faces of a workpiece, said workpiece twisting means comprising a first holder releasably secured to said upper arm and movable longitudinally thereof; a second holder secured to said upper arm adjacent one end thereof, a rotary member supported by said second holder for rotation about an axis extending through said first holder, said rotary member and said first holder having slots therein positioned to receive the opposite ends of an elongated workpiece; said embossing means comprising: spaced embossing rolls journaled to said main frame for rotation about spaced, parallel axes; means for releasably securing one of said embossing rolls to said main frame whereby the spacing between said embossing rolls may be adjusted to correspond to the thickness of the workpiece; and unitary means for operatively connecting said rotary means and the other of said embossing rolls in torque-transmitting relation with said drive shaft; said rotary means being rotated through a number of revolutions during one revolution of said drive shaft; said embossing rolls being rotated through a number of revolutions sufficient to emboss said workpiece along its entire length.

8. The apparatus as defined in claim 7 including means for shearing a number of workpieces of a variety of sizes and shapes, comprising a stationary shear plate secured to said main frame and a second shear plate engaged with said stationary shear plate; means supporting said second shear plate for movement relative to said stationary shear plate; said shear plates having a number of registrable openings whose shapes correspond to the shapes of a variety of workpieces; and means operatively connecting said second shear plate to said drive shaft for reciprocating said second shear plate relative to said stationary shear plate.

References Cited

UNITED STATES PATENTS

| | | | |
|---|---|---|---|
| 942,680 | 12/1909 | Takacs | 29—560 |
| 1,543,114 | 6/1925 | Lloyd | 29—27.1 |
| 2,071,201 | 2/1937 | Frech | 29—27.1 |
| 2,555,582 | 6/1951 | Edwards | 29—27.1 |
| 3,134,421 | 5/1964 | Simmons | 72—294 |

RICHARD J. HERBST, *Primary Examiner.*

K. C. DECKER, *Assistant Examiner.*